US011865547B2

(12) United States Patent
Mark et al.

(10) Patent No.: US 11,865,547 B2
(45) Date of Patent: Jan. 9, 2024

(54) DISTRIBUTION METERING DEVICE FOR A ROLLER MILL, ROLLER MILL WITH SUCH A DISTRIBUTION METERING DEVICE, METHOD FOR GRINDING GRINDING STOCK, AND ROLLER MILL COMPRISING A SWITCHING CABINET WITH A COOLING SYSTEM

(71) Applicant: BÜHLER AG, Uzwil (CH)

(72) Inventors: Daniel Mark, Wil (CH); Daniel Rickenbach, Wittenwil (CH); Stefan Salzmann, Rappersil (CH)

(73) Assignee: Bühler AG, Uzwil (CH)

( * ) Notice: Subject to any disclaimer, the term of this patent is extended or adjusted under 35 U.S.C. 154(b) by 120 days.

(21) Appl. No.: 17/528,912

(22) Filed: Nov. 17, 2021

(65) Prior Publication Data

US 2022/0072561 A1 Mar. 10, 2022

Related U.S. Application Data

(63) Continuation of application No. 17/058,412, filed as application No. PCT/EP2019/063644 on May 27, 2019, now Pat. No. 11,185,867.

(30) Foreign Application Priority Data

May 25, 2018 (EP) .................................... 18174239

(51) Int. Cl.
*B02C 4/02* (2006.01)
*B02C 25/00* (2006.01)
(Continued)

(52) U.S. Cl.
CPC .............. *B02C 25/00* (2013.01); *B02C 4/286* (2013.01); *B02C 4/02* (2013.01); *B02C 4/42* (2013.01)

(58) Field of Classification Search
CPC ........... B02C 25/00; B02C 4/286; B02C 4/02; B02C 4/42; B02C 4/28; B02C 19/186
See application file for complete search history.

(56) References Cited

U.S. PATENT DOCUMENTS 4,004,739 A 1/1977 Cramer
4,572,441 A 2/1986 Sangati
(Continued)

FOREIGN PATENT DOCUMENTS

CN 1055304 A 10/1991
CN 1078925 A 12/1993
(Continued)

OTHER PUBLICATIONS

Korean Office Action Corresponding to 10-2020-7037065 dated Mar. 10, 2021.
(Continued)

*Primary Examiner* — Faye Francis
(74) *Attorney, Agent, or Firm* — Finch & Maloney PLLC

(57) ABSTRACT

A distribution metering device (1) for a roller mill which includes a housing (2) with at least one grinding stock inlet (3), at least one grinding stock outlet (4), and a feed roll (5) which is arranged in the housing (2) for metering grinding stock into a grinding gap of the roller mill through the grinding stock outlet (4). The feed roll is rotatable about a feed roll axis (SA). A conveyor shaft (6) is arranged in the housing (2) for distributing grinding stock along the feed roll (5). The conveyor shaft is rotatable about a conveyor shaft axis (FA). The conveyor shaft axis (FA) is substantially parallel to the feed roll axis (SA), and a first fill state sensor (7) is arranged in the housing (2) for ascertaining a first grinding stock fill state of the housing (2).

15 Claims, 4 Drawing Sheets

(51) Int. Cl.

| | |
|---|---|
| ***B02C 4/28*** | (2006.01) |
| *B02C 4/42* | (2006.01) |

(56) References Cited

U.S. PATENT DOCUMENTS

| | | | | |
|---|---|---|---|---|
| 4,586,342 | A * | 5/1986 | Morishita | H05K 7/20336 62/3.4 |
| 4,619,408 | A | 10/1986 | Sangati | |
| 5,174,511 | A | 12/1992 | Ruegger et al. | |
| 5,433,391 | A | 7/1995 | Jagger et al. | |
| 5,485,965 | A | 1/1996 | Hostettler et al. | |
| 6,145,767 | A | 11/2000 | Hostettler | |
| 6,502,773 | B1 * | 1/2003 | Hostettler | B02C 4/286 241/34 |
| 8,540,176 | B2 | 9/2013 | Wallin et al. | |
| 8,960,577 | B2 | 2/2015 | Tjell | |
| 10,875,028 | B2 | 12/2020 | Okamoto et al. | |
| 2002/0145062 | A1 * | 10/2002 | Reed | B02C 17/166 241/23 |
| 2009/0236455 | A1 | 9/2009 | Strasser et al. | |
| 2012/0286078 | A1 | 11/2012 | Bresciani | |
| 2014/0084092 | A1 | 3/2014 | Braun et al. | |
| 2015/0290654 | A1 | 10/2015 | Permi et al. | |
| 2016/0067713 | A1 | 3/2016 | Okamoto et al. | |
| 2016/0107162 | A1 * | 4/2016 | Busenhart | B02C 4/32 241/25 |

FOREIGN PATENT DOCUMENTS

| | | | |
|---|---|---|---|
| CN | 1261295 | | 7/2000 |
| CN | 101460247 | A | 6/2009 |
| CN | 201304357 | Y | 9/2009 |
| CN | 202940691 | U | 5/2013 |
| CN | 103547372 | A | 1/2014 |
| CN | 106179580 | A | 12/2016 |
| DE | 870 933 | | 3/1953 |
| DE | 1 204 052 | | 10/1965 |
| DE | 32 09 561 | A1 | 9/1983 |
| DE | 10 2006 020 499 | A1 | 10/2007 |
| DE | 20 2011 102 923 | U1 | 11/2012 |
| EP | 0 515 596 | B1 | 11/1994 |
| GB | 703 123 | | 1/1954 |
| JP | S33-8412 | | 9/1958 |
| JP | 2002504854 | A | 12/1998 |
| JP | 2002271075 | A | 9/2002 |
| JP | 2002271076 | A | 9/2002 |
| JP | 2004173358 | A | 6/2004 |
| JP | 2005129748 | A | 5/2005 |
| JP | 2005-169198 | A | 6/2005 |
| JP | 2010058115 | | 3/2010 |
| JP | 2014512958 | A | 5/2014 |
| JP | 2014-213223 | A | 11/2014 |
| WO | 9306928 | A1 | 4/1993 |
| WO | 9858738 | A1 | 12/1998 |

OTHER PUBLICATIONS

Japanese Office Action Corresponding to 2020-565876 dated Apr. 20, 2021.

Chinese Office Action Corresponding to 201980046037.9 dated Apr. 26, 2021.

Partial European Search Report Corresponding to 18174239 dated Nov. 27, 2018.

European Search Report Corresponding to 18174239 dated Feb. 1, 2019.

International Search Report Corresponding to PCT/EP2019/063644 dated Sep. 4, 2019.

Written Opinion Corresponding to PCT/EP2019/063644 dated Sep. 4, 2019.

Office Action corresponding to Japanese Application No. 2021-159213 dated Aug. 18, 2022.

Japanese Office Action Corresponding to 2021-159213 dated Feb. 3, 2023.

Chinese Office Action Corresponding to 202210198533 dated Jan. 5, 2023.

Korean Office Action Corresponding to 20217034574 dated Mar. 14, 2013.

Australian Office Action Corresponding to 2021261834 dated Mar. 22, 203.

Indian Office Action Corresponding to 202017052744 dated Apr. 12, 2021.

* cited by examiner

DISTRIBUTION METERING DEVICE FOR A ROLLER MILL, ROLLER MILL WITH SUCH A DISTRIBUTION METERING DEVICE, METHOD FOR GRINDING GRINDING STOCK, AND ROLLER MILL COMPRISING A SWITCHING CABINET WITH A COOLING SYSTEM

The invention relates to a distributing and metering device for a roller mill and to a roller mill having a distributing and metering device according to the invention. The invention further relates to a method for the milling of milling material with a roller mill which comprises a distributing and metering device according to the invention and to a roller mill having a switching cabinet which has a cooling system.

In roller mills from the prior art, the milling material is introduced centrally into the intake of the respective milling pass and banked up. The milling material is then distributed outwardly by gravitation, where appropriate with the aid of a paddle roller, and conveyed into the milling gap by the feeding roller.

At the start of the milling operation, first of all the filling height of the intake is predetermined manually, for example by an operator, as desired level. What has to be taken into consideration here is that, on the one hand, sufficiently free buffer volume is available (level as low as possible), but, on the other hand, that the milling material reaches as far as the ends of the discharge unit (level as high as possible). A measuring device (for example a force transducer) is used during operation to detect a deviation of the actual level from the desired level. A control device ensures that the discharge is adapted in such a way that the actual level corresponds as far as possible to the desired level. Force transducers have the disadvantage that the filling level of the milling material is measured not directly, but indirectly, and thus a calibration has to be carried out which strongly depends on the milling material properties. For all other measuring principles in the prior art, this is likewise the case (for example capacitive sensors), albeit less pronounced. In the prior art, the milling material flows in the simplest case in the direction of the ends of the discharge unit only by virtue of gravitation. It is thus not possible in each case to ensure that milling material is present at the ends of the discharge unit and can be discharged to the roller ends. Serious damage can occur if no milling material is conveyed into the milling gap at the roller ends. The prior art also includes distributing devices (for example paddle rollers) which assist in transporting the milling material to the ends of the discharge unit. A disadvantage with all the systems belonging to the prior art is that this distribution function is not automatically controlled or regulated during operation and independently of the milling material.

A disadvantage with such roller mills is that the operator has to manually define the filling height as desired level. This "empirical" setting of the desired level is also intended to ensure that the distribution of milling material along the length of the feeding roller is ensured. Checking/monitoring of the distribution of milling material along the feeding roller takes place, if at all, only visually. What occurs during operation is that, in the case of an unsuitable selection of the desired level and/or with an unsuitable presetting of the distributing device, the milling material does not reach as far as the ends of the discharge unit. The correct setting is also difficult for a person skilled in the art. In the case of milling material properties which change during operation, the risk of a fault is greater still during critical passes with the prior art. On the other hand, it is important that, with the central introduction of product, the milling material is not segregated, since the product will not be mixed in the intake. The risk of segregated milling material in the intake arises particularly when different milling material grades flow into the intake through two or more supply pipes.

It is therefore an object of the present invention to provide a distributing and metering device for a roller mill and also a roller mill which avoid the disadvantages of the known system and in particular allow optimal distribution of milling material along the metering shaft. It is further intended thereby to assist mixing of the milling material in the intake region.

The object is achieved by a distributing and metering device, a roller mill and a method having the features of the independent claims.

The distributing and metering device comprises a housing having at least one milling-material inlet and at least one milling-material outlet and also a feeding roller, which is arranged in the housing, for metering milling material into a milling gap of the roller mill through the milling-material outlet, which roller is rotatable about a feeding roller axis.

The distributing and metering device further comprises a conveying shaft, which is arranged in the housing, for distributing milling material along the feeding roller, which shaft is rotatable about a conveying shaft axis, wherein the conveying shaft axis is arranged parallel to the feeding roller axis, and a first filling level sensor, which is arranged in the housing, for determining a first milling-material filling level of the housing. It will be understood that individual sensors (for example sensor strips) can also be interconnected in order for example to be able to cover a greater height with such a combined filling level sensor.

According to the invention, the distributing and metering device further comprises a second filling level sensor, which is arranged in the housing, for determining a second milling-material filling level of the housing, wherein the milling-material inlet and the first filling level sensor are arranged at a first end of the feeding roller and of the conveying shaft, and the second filling level sensor is arranged at a second end of the feeding roller and of the conveying shaft.

What is meant by "at a first end" or "at a second end" for the purposes of the present invention is that the first or second sensor is respectively arranged at a first or last third of the feeding roller. The filling level sensors are preferably arranged respectively at the first and last quarter of the feeding roller. The range indications relate to the length of the feeding roller in the axial direction.

The distributing and metering device is as a rule arranged above the milling rollers of a roller mill. Milling material is supplied to the housing of the distributing and metering device and forms there a store which serves as a buffer for the operation of the roller mill, with the result that small mass flow fluctuations can be smoothed out. The feeding roller then conveys the milling material to the milling-material outlet of the distributing and metering device and from there into the milling gap. The milling roller axis is preferably arranged parallel to the roller axis of the milling rollers of the roller mill.

In order to ensure the distribution of the milling material along the feeding roller, there is provided a conveying shaft. Rotating the conveying shaft ensures that milling material is conveyed in one direction along the conveying shaft axis, with the result that by that distribution of milling material is assisted by gravitational force. Here, the conveying shaft preferably takes the form of a screw conveyor or paddle roller. Further preferably, a conveying region of the conveying shaft, that is to say the region of the conveying shaft which brings about conveyance of milling material, extends over at least half the axial length of the feeding roller, preferably over the entire axial length of the feeding roller.

This construction thus ensures that the feeding roller is supplied with milling material over its entire length and thus the milling gap is not operated in certain regions without a milling-material supply. The conveying shaft moreover brings about mixing of milling material in the distributing and metering device that counteracts segregation as a result of conical heap formation (in particular as a result of the sieving effect).

The milling-material inlet is arranged at a first end of the feeding roller and of the conveying shaft. This means that, unlike in known devices, milling material is not supplied in the center of the feeding roller, but in an end region of the feeding roller and of the conveying shaft. In this end region there is also situated the first filling level sensor for determining a first milling-material filling level. The height of the milling material can be determined by the first filling level sensor.

A second filling level sensor is arranged at the other end of the feeding roller and of the conveying shaft. A second milling-material filling level, that is to say the height of the milling material, can thus be determined.

A filling level sensor is thus arranged one at each end of the feeding roller (and of the conveying shaft). The lateral arrangement of the milling-material inlet and the arrangement according to the invention of the filling level sensors allows conclusions to be drawn as to whether the feeding roller is supplied with enough milling material over its entire length.

If the milling-material inlet is, not according to the invention, arranged centrally, the distributing and metering device is mirror-imaged. The first filling level sensor is arranged underneath the milling-material inlet, and two second filling level sensors are arranged at both ends of the feeding roller and of the conveying shaft. The conveying shaft is then designed in such a way that milling material can be conveyed away from the center thereof to the two ends by rotation. The conveying shaft is preferably of two-part design such that in each case one half can be moved independently of the other half. It is evident that such a design form merely constitutes a mirror-imaging of the distributing and metering device described herein.

Here, the feeding roller and the conveying shaft are preferably movable independently of one another. This means that the feeding roller and/or the conveying shaft have/has a dedicated drive and, unlike what is known from the prior art, the feeding roller and conveying shaft are not driven in a coupled manner. The feeding roller and the conveying shaft preferably have their own drive.

The rotational speed of the feeding roller can preferably be controlled or regulated in dependence on the first milling-material filling level. This means that the rotational speed of the feeding roller is set in dependence on the first milling-material filling level determined by the first filling level sensor.

The feeding roller is preferably driven at a low rotational speed if the first milling-material filling level is low. The rotational speed is then increased if the first milling-material filling level rises.

In particular, there can be provision that the first milling-material filling level is kept substantially constant by means of a corresponding control unit. For this purpose, the desired value can be permanently programmed in the control unit, can be dependent on other factors or can be set by an operator. Here, the rotational speed of the feeding roller is adapted in dependence on the deviation between the desired value and actual value of the first milling-material filling level.

The rotational speed of the conveying shaft can preferably likewise be controlled or regulated in dependence on the second milling-material filling level. This means that the rotational speed of the conveying shaft is set in dependence on the second milling-material filling level determined by the second filling level sensor.

The conveying shaft is preferably driven at a first rotational speed if the second milling-material filling level is low. The rotational speed is then reduced if the second milling-material filling level rises.

In particular, there can be provision that the second milling-material filling level is kept substantially constant by means of a corresponding control unit. For this purpose, the desired value can be permanently programmed in the control unit, can be dependent on other factors or can be set by an operator. Here, the rotational speed of the conveying shaft is adapted in dependence on the deviation between the desired value and actual value of the second milling-material filling level.

Changing the rotational speed of the feeding roller correspondingly causes more or less milling material to be discharged. The measurement of the second milling-material filling level and the corresponding rotation of the conveying shaft ensure here that milling material is distributed over the entire length of the feeding roller. In addition, the milling material is mixed by the conveying shaft.

The milling-material outlet is preferably designed as a gap between the feeding roller and a throttle device.

Here, the throttle device preferably comprises a rotatable profile with a circular segment-shaped cross section. Such a profile can be produced for example from a circular profile simply by removing/grinding a circular segment. It is advantageous here for a metering edge of the profile to be stiffer than in known solutions in which the throttle device comprises a flap which is composed of a plurality of elements. The elements then have to be oriented in order to form a straight metering edge. Moreover, a profile having a circular segment-shaped cross section is flexurally stiffer than known solutions.

In the case of such a device having a milling-material outlet formed as a gap between the feeding roller and a throttle device, it is preferable that a gap width of the gap can be controlled or regulated in dependence on the first milling-material filling level. It is particularly preferable in such a case for the feeding roller to be operated at a constant rotational speed and for the milling-material discharge amount to be set only via the gap width.

The distributing and metering device preferably comprises a guiding arrangement for guiding milling material to the feeding roller. The guiding arrangement preferably takes the form here of a chute surface. The guiding arrangement ends with an edge which is arranged at a distance from the feeding roller of between 0.001 and 5 mm. Here, in a radial section through the feeding roller, the edge is arranged at an angular distance of between 0° and 90° with respect to a perpendicular through the feeding roller axis. In other words, the edge is arranged between 9 o'clock and 12 o'clock.

Such an arrangement of the edge allows the minimization of dead spaces around the feeding roller so as to allow improved hygiene of the distributing and metering device. Moreover, cleaning/residue emptying of the distributing and metering device is simplified.

The distributing and metering device further comprises a control unit which is operatively connected to the first and second filling level sensor and by means of which the feeding roller and/or the conveying shaft can be controlled/regulated. Here, the control unit is arranged in a switching cabinet with a cooling system which comprises at least one Peltier element.

The control unit serves for control/regulation of the rotation of the feeding roller and of the conveying shaft and controls/regulates them in particular in dependence on the first or second milling-material filling level. It is of course possible for further sensors to be operatively connected to the control unit that are likewise used for controlling/regulating the feeding roller and the conveying shaft.

On account of the environment properties of a roller mill, the control unit must, on the one hand, be protected from external influences (dust) and, on the other hand, it must, for safety reasons (dust explosion risk) as possible ignition source, be accommodated securely and so as to be separated away from the environment. Previous solutions proposed a central switching cabinet from which the entire installation (a plurality of roller mills) is fed and controlled/regulated. The installation effort here is very high since many lines have to be laid from the switching cabinet to the respective machine. A switching cabinet arranged directly on the distributing and metering device dispenses with this installation effort. In particular, it is required only for 3 lines to be connected to the control unit (power supply; data transmission, for example BUS; safety shut-off). The device can thus be installed and configured already at the factory and has at the mounting site only to be connected with the respective line according to the "plug-and-play concept". In order to remove the heat arising during operation, the switching cabinet comprises at least one Peltier element for cooling the interior of the switching cabinet.

Of advantage here is the isolation between exterior and interior such that possible ignition sources are not connected to the roller mill environment.

The invention further relates to a roller mill having a distributing and metering device according to the invention. All the above-described advantages and developments of the distributing and metering device are thus also correspondingly applicable to a roller mill according to the invention.

The roller mill comprises at least two rollers which define a roller gap for the milling of milling material, wherein the roller gap is supplied with milling material from the milling-material outlet of the distributing and metering device.

The invention further relates to a method for the milling of milling material in a roller mill. Here, the roller mill comprises a distributing and metering device according to the invention. All the above-described advantages and developments of the distributing and metering device and of the roller mill are thus also correspondingly applicable to a method according to the invention.

According to the invention, milling material is supplied to the roller mill via a distributing and metering device according to the invention.

Milling material is supplied to the distributing and metering device via the milling-material inlet and then leaves the distributing and metering device through the milling-material outlet.

A rotational speed of the feeding roller is preferably controlled or regulated in dependence on the first milling-material filling level. The rotational speed of the feeding roller is in particular adapted to be proportional to a deviation between a desired value of the first milling-material filling level and the actual value of the first milling-material filling level.

A rotational speed of the conveying shaft is preferably controlled or regulated in dependence on the second milling-material filling level. The rotational speed of the conveying shaft is in particular adapted to be inversely proportional to a deviation between a desired value of the second milling-material filling level and the actual value of the second milling-material filling level.

If the distributing and metering device is formed with a milling-material outlet designed as a gap between the feeding roller and a throttle device, a gap width of the gap is preferably controlled or regulated in dependence on the first milling-material filling level. Here, the rotational speed of the feeding roller is in particular kept constant (that is to say not changed during operation). Here, the gap width is adapted in particular to be proportional to a deviation between a desired value of the first milling-material filling level and the actual value of the first milling-material filling level.

The invention further relates to a roller mill comprising at least two rollers arranged in a housing, a milling-material inlet, a milling-material outlet and a control unit for controlling and/or regulating the roller mill. Here, the control unit is arranged in a switching cabinet with a cooling system, wherein the switching cabinet is arranged on the roller mill, in particular on the housing. The cooling system comprises at least one Peltier element.

On account of the environment properties of a roller mill, the control unit must, on the one hand, be protected from external influences (dust) and, on the other hand, it must, for safety reasons (dust explosion risk) as possible ignition source, be accommodated securely and so as to be separated away from the environment. Previous solutions proposed a central switching cabinet from which the entire installation (a plurality of roller mills) is fed and controlled/regulated. The installation effort here is very high since many lines have to be laid from the switching cabinet to the respective machine. A switching cabinet arranged directly on the distributing and metering device dispenses with this installation effort. In particular, it is required only for 3 lines to be connected to the control unit (power supply; data transmission, for example BUS; safety shut-off). The device can thus be installed and configured already at the factory and has at the mounting site only to be connected with the respective line according to the "plug-and-play concept". In order to remove the heat arising during operation, the switching cabinet comprises at least one Peltier element for cooling the interior of the switching cabinet.

The switching cabinet contains, in addition to machine control elements, at least one power electronics component which serves to operate the main drive motors of the rollers of the roller mill and/or the drive motors of the feeding unit of the roller mill. The power electronics component is preferably selected from the group consisting of safety switches, main switches, soft starters, frequency converters (inverters) and heavy-current power lines.

The present invention thus further relates to a milling installation having a plurality of roller mills, wherein each roller mill comprises at least two rollers arranged in a housing, a milling-material inlet, a milling-material outlet, a distributing and metering device and a control unit for controlling and/or regulating the roller mill, characterized in that in each roller mill the control unit is arranged in a switching cabinet with a cooling system which is arranged directly on the distributing and metering device at the respective roller mill, wherein the cooling system particularly comprises at least one Peltier element, and in that all the connection lines of the respective roller mill are connected via its control unit in the switching cabinet at the roller mill.

Of advantage here is the isolation between exterior and interior such that possible ignition sources are not connected to the roller mill environment.

The invention will be better described below on the basis of a preferred exemplary embodiment in conjunction with the figures, in which.

Figure 1:
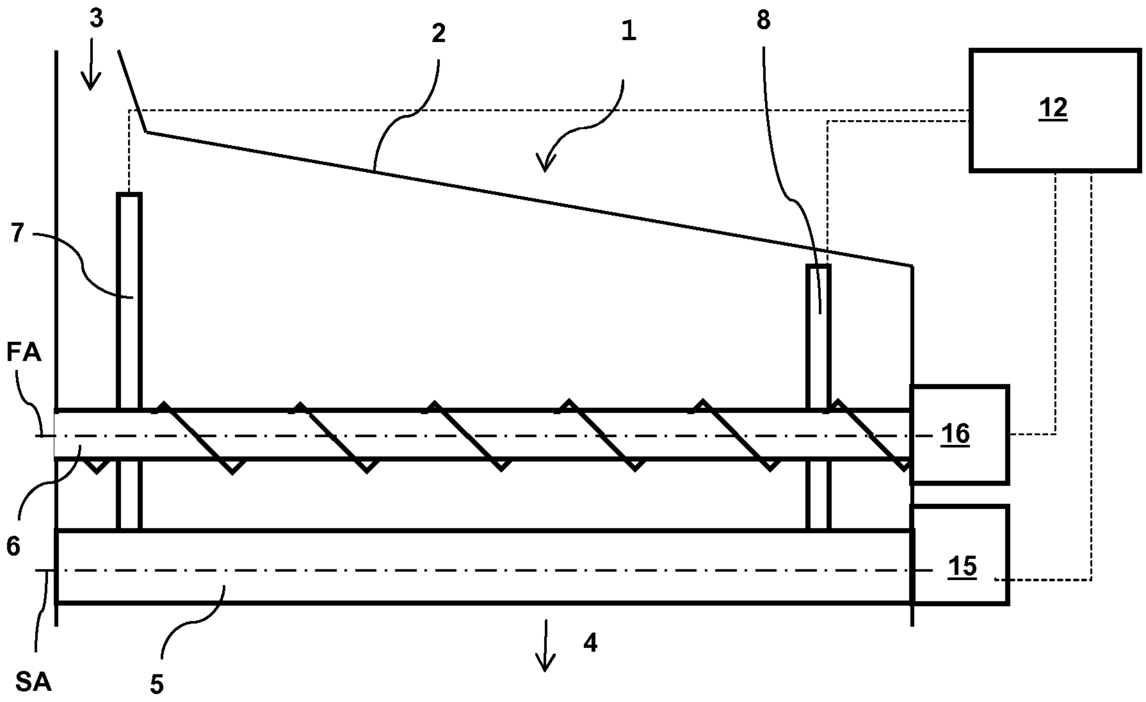
FIG. 1 shows a schematic sectional view of the distributing and metering device according to the invention in a plane parallel to the feeding roller shaft.
Figure 2:
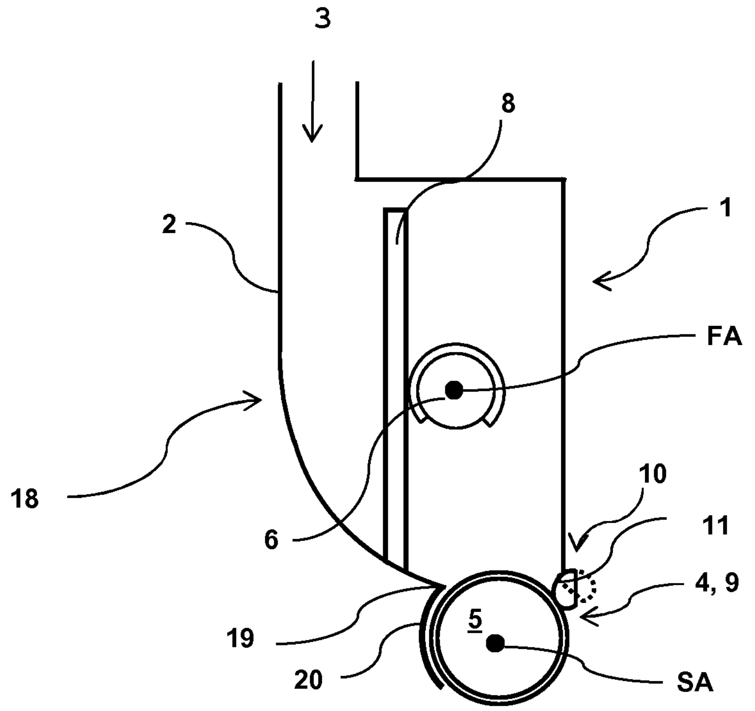
FIG. 2 shows a schematic sectional view of the distributing and metering device according to the invention in a plane perpendicular to the feeding roller shaft.

FIGS. 1 and 2 schematically illustrate a distributing and metering device 1. The distributing and metering device 1 comprises a housing 2 having a milling-material inlet 3 and a milling-material outlet 4. In the housing 2 there are arranged a feeding roller 5, which can be rotated about a feeding roller axis SA, and, above the feeding roller 5 in the milling-material flow direction, a conveying shaft 6. The conveying shaft in this case takes the form of a screw conveyor and can be rotated about the conveying shaft axis FA, which is parallel to the feeding roller axis SA. To drive the feeding roller 5 and the conveying shaft 6, respective motors 15 and 16 are present. The motors 15 and 16 are operatively connected to a control unit 12 (schematically illustrated by the dashed line).

In the housing 2 there are arranged two filling level sensors 7 and 8 which are designed to determine the milling-material filling level in the housing and are likewise operatively connected to the control unit 12.

The first filling level sensor 7 is arranged in the region of the milling-material inlet 3 at a first end of the feeding roller 5 and of the conveying shaft 6. The second filling level sensor 8 is arranged at the other end of the feeding roller 5 and of the conveying shaft 6. Two filling level sensors 7 and 8 are thus arranged at the two ends of the feeding roller 5 and of the conveying shaft 6. The milling-material inlet 3 is likewise situated not centrally as in the case of known devices, but is arranged above the first end of the feeding roller 5 and of the conveying shaft 6.

In FIG. 2 there can also be seen the construction of a throttle device 10 which is used for setting a gap 9 which serves as a milling-material outlet 4 of the housing 2. The throttle device 10 comprises, in addition to actuators and bearings, an elongate profile 11 with a circular segment-shaped cross section. Rotating the profile 11 (schematically illustrated by the dashed position) allows the gap width of the gap 9 to be set.

Also visible in FIG. 2 is the arrangement of the guiding arrangement 18 which takes the form of a chute. The guiding arrangement ends with an edge 19 close to the surface of the feeding roller 5. The edge 19 is arranged such that no milling material can pass under the feeding roller 5 or no milling material can remain in the feeding space; for example, the edge 19 can for this purpose be arranged at an angular distance of 0° to 90° with respect to a perpendicular through the feeding roller axis SA. This arrangement reduces any dead space around the feeding roller and facilitates residue emptying/cleaning of the distributing and metering device 1. A shroud 20 adjoins the edge 19 for sealing purposes. In the prior art, the feeding space encloses the feeding roller (discharge roller) for the most part, with the result that a dead zone is formed below the feeding roller (discharge roller) that cannot be completely emptied during operation and would thus have to be cleaned manually at a standstill. This dead zone can be an unwanted home for insects etc. Given the arrangement of the edge 19, it should therefore ideally be ensured that no such dead zone can form.

During operation of the distributing and metering device 1, milling material is supplied through the milling-material inlet 3. Rotation of the conveying shaft 6 causes the milling material to be conveyed from the first end in the direction of the second end of the feeding roller 6. This distribution is monitored by the second filling level sensor 8. If the second milling-material filling level (actual value) measured by the second filling level sensor 8 deviates from a desired value of the second milling-material filling level, the rotational speed of the conveying shaft 6 is correspondingly adapted such that more or less milling material is conveyed to the other end of the feeding roller 5.

The feeding roller 5 is driven at the same time. If the first milling-material filling level (actual value) measured by the first filling level sensor 7 deviates from a desired value of the first milling-material filling level, the rotational speed of the feeding roller 5 is correspondingly adapted such that more or less milling material is discharged to ensure that the filling height of the housing remains constant.

Figure 3:
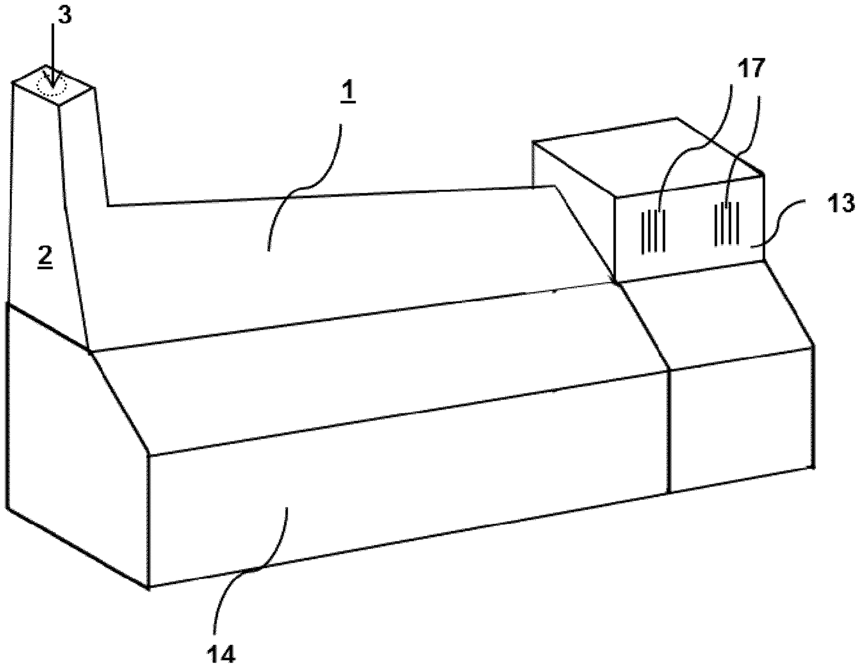
FIG. 3 shows a schematic perspective view of the roller mill according to the invention with a distributing and metering device and a switching cabinet.

In FIG. 3 there can be seen a roller mill 14 having a distributing and metering device 1. Emphasis should be placed on the switching cabinet 13 which is arranged on the roller mill and which accommodates the control unit 12 and is cooled by Peltier elements 17 (of which only cooling ribs are visible). Other ATEX-compliant cooling systems are also conceivable, for example liquid cooling systems, in particular water cooling systems; ATEX-compliant fans; etc.

Figure 4:
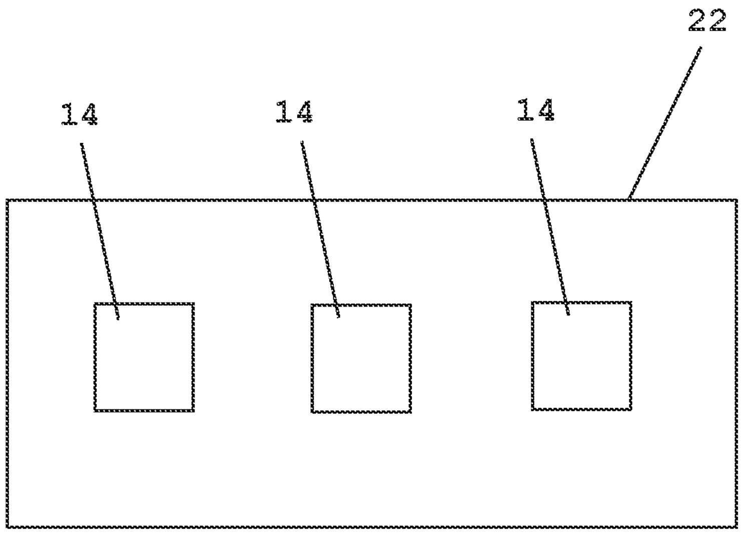
FIG. 4 shows a diagrammatic view of a milling installation having a plurality of roller mills.

FIG. 4 diagrammatically illustrates a milling installation 22 or facility having a plurality of roller mills 14. As each of these roller mills 14 are described above with reference to the singular roller mill 14 and distributing and metering device 1 of FIGS. 1-3, no further description of the same is believed to be necessary.

The invention claimed is:

1. A milling installation, being a facility with a plurality of roller mills (14), wherein each roller mill (14) of the Plurality of roller mills comprises;

at least two rollers arranged in a housing (2), a milling-material inlet (3), a milling-material outlet (4), a distributing and metering device (1) comprising a feeding roller, which is arranged in the housing, for metering milling material into a milling gap of the roller mill through the milling-material outlet, and a conveying shaft, which is arranged in the housing, for distributing milling material along the feeding roller, and wherein the roller mill (14) comprises a control unit (12) for controlling and/or regulating said roller mill (14), the control unit (12) being arranged in a switching cabinet (13) with a cooling system, which switching cabinet is arranged directly on the distributing and metering device (1) at the roller mill (14), and all connecting lines of the roller mill (14) are connected via the control unit (12) in the switching cabinet (13) at the roller mill (14).

2. The milling installation according to claim 1, wherein the cooling system comprises at least one Peltier element (17).

3. The milling installation according to claim 2, wherein the switching cabinet (13) additionally contains at least one power electronics component.

4. The milling installation according to claim 3, wherein the at least one power electronics component is selected from the group consisting of safety switches, main switches, soft starters, frequency converters (inverters) and heavy-current power lines.

5. The milling installation according to claim 1, wherein three lines are connected to the control unit (12).

6. The milling installation according to claim 1, wherein the switching cabinet isolates an interior of the switching cabinet (13) from an exterior of the switching cabinet.

7. The milling installation according to claim 6, wherein the switching cabinet (13) additionally contains at least one power electronics component.

8. The milling installation according to claim 7, wherein the at least one power electronics component is selected from the group consisting of safety switches, main switches, soft starters, frequency converters (inverters) and heavy-current power lines.

9. The milling installation according to claim 5, wherein the switching cabinet (13) additionally contains at least one power electronics component.

10. The milling installation according to claim 9, wherein the at least one power electronics component is selected from the group consisting of safety switches, main switches, soft starters, frequency converters (inverters) and heavy-current power lines.

11. The milling installation according to claim 1, wherein the switching cabinet isolates an interior of the switching cabinet (13) from an exterior of the switching cabinet.

12. The milling installation according to claim 11, wherein the switching cabinet (13) additionally contains at least one power electronics component.

13. The milling installation according to claim 12, wherein the at least one power electronics component is selected from the group consisting of safety switches, main switches, soft starters, frequency converters (inverters) and heavy-current power lines.

14. The milling installation according to claim 1, wherein the switching cabinet (13) additionally contains at least one power electronics component.

15. The milling installation according to claim 14, wherein the at least one power electronics component is selected from the group consisting of safety switches, main switches, soft starters, frequency converters (inverters) and heavy-current power lines.

* * * * *